US011788586B1

(12) United States Patent
Davis et al.

(10) Patent No.: US 11,788,586 B1
(45) Date of Patent: Oct. 17, 2023

(54) METHOD FOR ENGAGING AND DISENGAGING CLUTCH ELEMENTS OF A TRANSMISSION

(71) Applicant: Sigma Powertrain, Inc., Livonia, MI (US)

(72) Inventors: R. William Davis, Orion, MI (US); Graham Scott Russell, Clarkston, MI (US); Daniel E. Knieper, Clarkston, MI (US); John W. Kimes, Clermont, FL (US)

(73) Assignee: Sigma Powertrain, Inc., Livonia, MI (US)

( * ) Notice: Subject to any disclaimer, the term of this patent is extended or adjusted under 35 U.S.C. 154(b) by 0 days.

(21) Appl. No.: 17/898,411

(22) Filed: Aug. 29, 2022

(51) Int. Cl.
*F16D 41/16* (2006.01)

(52) U.S. Cl.
CPC .................................. *F16D 41/16* (2013.01)

(58) Field of Classification Search
CPC ........... F16D 41/16; F16D 41/08; F16D 41/14
See application file for complete search history.

(56) References Cited

U.S. PATENT DOCUMENTS

| 2003/0188947 A1* | 10/2003 | Fitz ...................... F16D 41/125 |
| | | 192/69.1 |
| 2018/0094676 A1* | 4/2018 | Campton ................ F16D 41/14 |
| 2019/0170199 A1* | 6/2019 | Kurosaki ................ F16D 41/12 |
| 2019/0264760 A1* | 8/2019 | Peglowski ............. F16D 41/08 |

FOREIGN PATENT DOCUMENTS

JP 2019074177 A * 5/2019

* cited by examiner

*Primary Examiner* — Lori Wu
(74) *Attorney, Agent, or Firm* — Simonelli IP, PLLC (57) ABSTRACT

A method selectively locks a notch plate to a pocket plate such that the notch and pocket plates rotate together. The pocket plate includes struts that work in opposite directions. The pocket plate rotational speed and the notch plate rotational speed are identified. Once the notch plate rotational speed is close to the pocket plate rotational speed, the struts in one direction are activated. Once seated, the struts in the other direction are activated. This two-step engagement of the struts provides a smoother transition between clutch engagements (gear shifts) while not requiring the precision of having all struts activated at the same time.

7 Claims, 11 Drawing Sheets

METHOD FOR ENGAGING AND DISENGAGING CLUTCH ELEMENTS OF A TRANSMISSION

BACKGROUND ART

1. Field of the Invention

The invention relates to a method for shifting between two gears of a transmission. More particularly, the invention relates to a method for shifting between two gears of a transmission using digital coupling components.

2. Description of the Related Art

Transmissions in vehicles are used to control rotational torque to move the vehicle effectively and as efficiently as possible. Traditionally, transmissions employ hydraulic or pneumatic clutches (hydraulic clutches) to change gear ratios. Hydraulic clutches are, however, very inefficient in that much of the energy used to operate the hydraulic clutches is converted into thermal energy, much of which is dissipated into the atmosphere. In addition, hydraulic clutches require constant pressure to remain engaged, which further expends energy. This waste of energy is not acceptable in vehicles that use batteries as a primary energy source to create the motive force of the vehicle.

Digital clutches can be used to vastly reduce the amount of energy used during a change in gears of a transmission. Control of these digital clutches in the transmission are paramount to the proper function of the transmission. If a digital clutch does not transition properly, it could damage the transmission.

SUMMARY OF THE INVENTION

A method selectively locks a notch plate to a pocket plate such that the notch and pocket plates rotate at the same speed. The pocket plate subassembly includes at least one first direction strut and at least one second direction strut. The method includes the step of identifying a pocket rotational speed of the pocket plate. The method also identifies a notch rotational speed of the notch plate. The rotational speeds of the notch and pocket plates are modified so the rotational speeds are approximately equal. The at least one first direction strut is pivoted to extend out past the pocket plate which allows the at least one first direction strut to engage the notch plate. The notch rotational speed is then decreased to equal the pocket rotational speed allowing the at least one first direction strut to extend into the notch of the notch plate. The notch rotational speed is further reduced to less than the pocket rotational speed such that the notch plate engages the at least one first direction strut. The method then pivots the at least one second direction strut to engage the notch plate preventing relative motion between the notch and pocket plates in either direction.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE DRAWINGS

For purposes of this discussion, elements will be identified by reference characters, typically reference numerals. There are a few embodiments shown in the Figures that will be described in detail below. For purposes of simplicity, these elements will retain their reference characters throughout the discussion. If an element has characteristics that are different from one embodiment to another, those differences will be discussed when introducing the same element for the new embodiment.

Figure 1A:
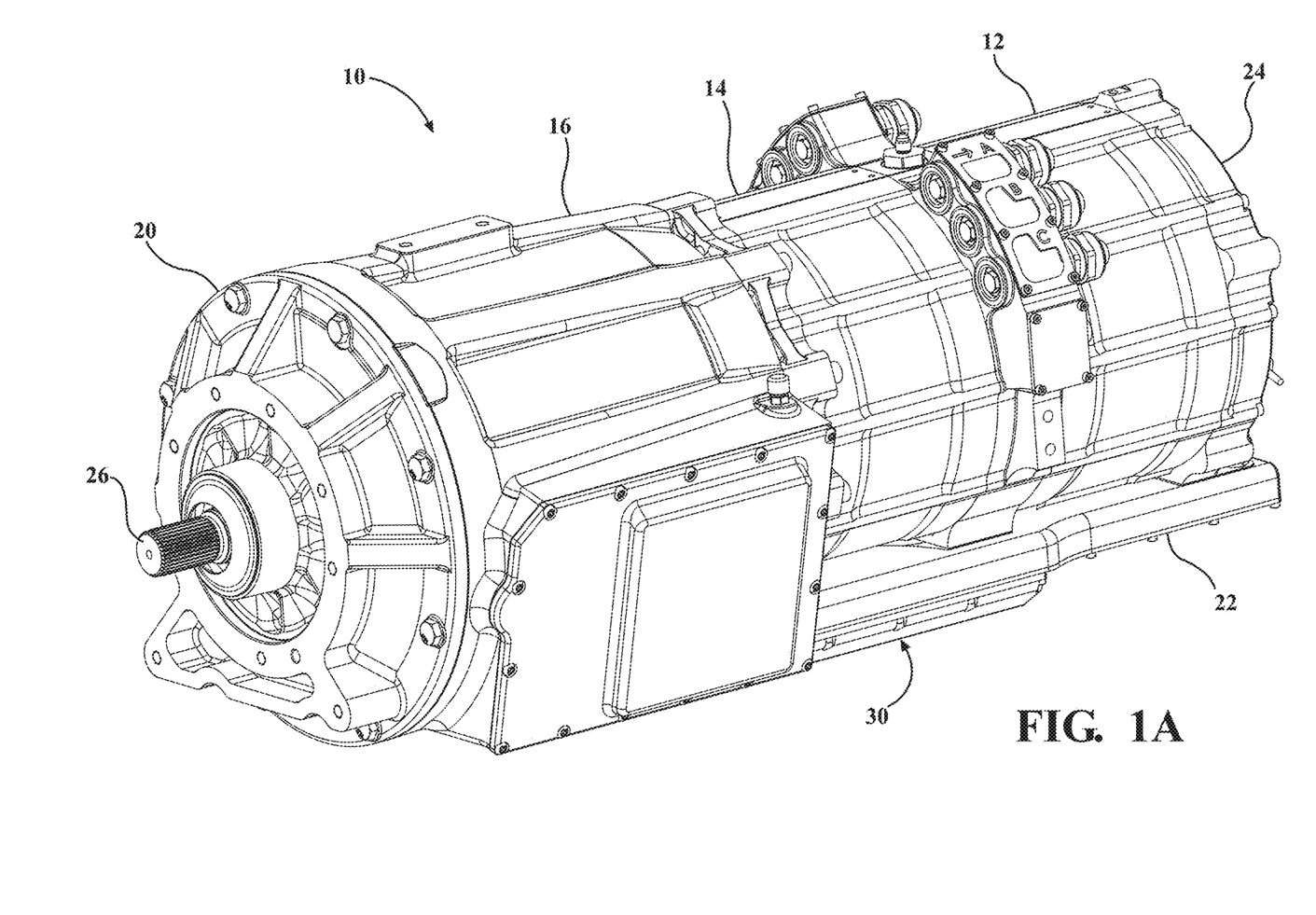
FIG. 1A is a perspective view of one embodiment of a vehicular powertrain.

Referring to FIG. 1A, a perspective view of one embodiment of a transmission is generally shown at 10. In this Figure, the transmission 10 is operatively connected to a first motor 12 and a second motor 14. Physically, the second motor 14 is mounted to the transmission 10 between the transmission 10 and the first motor 12. The first motor 12 has an output (discussed subsequently) that extends through the second motor 14 and to the transmission 10.

Figure 1B:
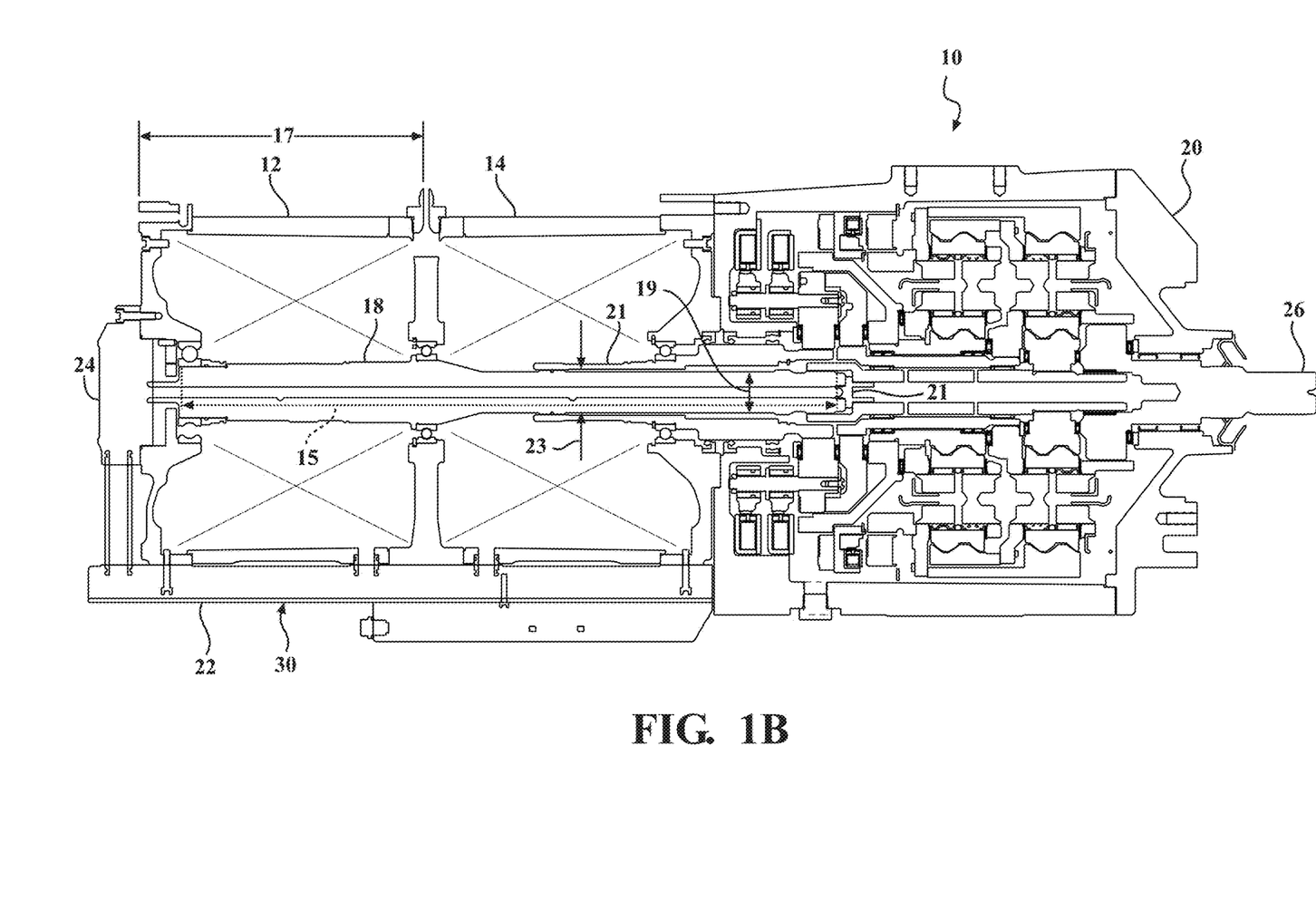
FIG. 1B is a schematic drawing of a cross-section of the embodiment shown in FIG. 1A.

The transmission 10 includes a transmission housing 16 having a housing cap 20. FIGS. 1A and 1B show the second motor 14 (B-Motor) secured to the transmission housing 16 and the first motor 12 (A-Motor) secured to the second motor 14 (B-Motor). A first motor output shaft 18 of the first motor 12 (A-Motor) defines a length 15 that is longer than a length 17 of the first motor 12. The first motor output shaft 18 also defines an outer diameter 19 at its distal end 21.

The second motor 14 (B-Motor) includes a second motor output shaft 21. The second motor output shaft 21 defines an inner diameter 23 that is larger than the outer diameter 19 of the first motor output shaft 18. The first motor output shaft 18 extends through and is coaxial with the second motor output shaft 21. It should be appreciated by those skilled in the art that the first motor output shaft 18 may not extend all the way through the second motor output shaft 21.

In alternative embodiments that will be discussed in greater detail below, the first 12 and second 14 motors may be mounted on either side of the transmission 10. Oil used to cool the transmission 10, the first motor 12 and the second motor 14 is collected by a catch basin 22 and recirculated using a pump 24, which is in fluid communication with the catch basin 22. Because the catch basin 22 extends along the entire length of the transmission 10, the first motor 12 and the second motor 14, only one pump 24 is necessary. The transmission 10 has an output shaft 26 that extends out through the center of the housing cap 20. Electrical ports (not shown) provide electrical access inside the first 12 and second 14 motors. The transmission 10, first motor 12, second motor 14, and pump 24 may be referred to as a powertrain, generally shown at 30.

Figure 2:
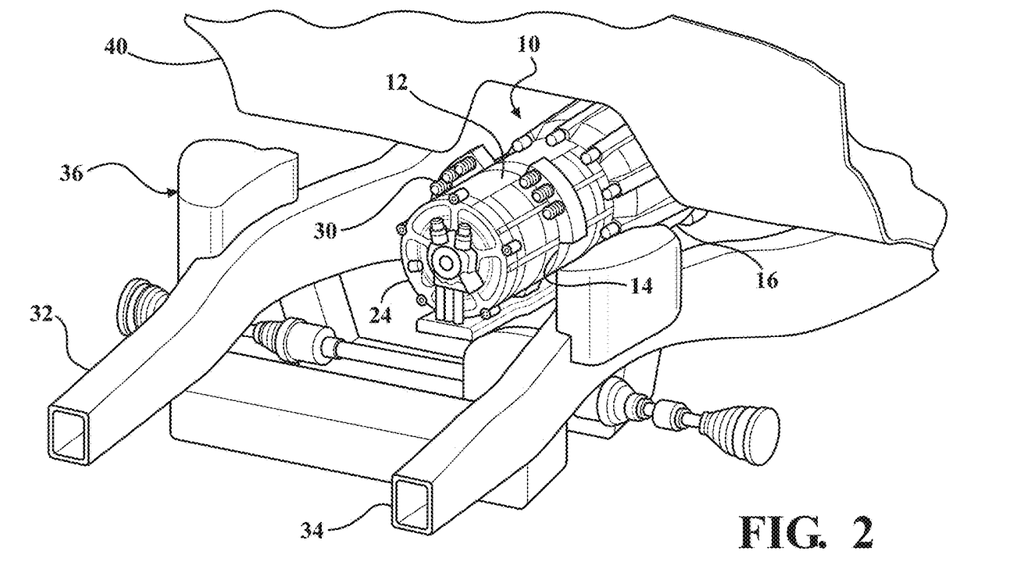
FIG. 2 is a perspective view of the powertrain embodiment shown in FIGS. 1A and 1B mounted to a vehicle.
Figure 3:
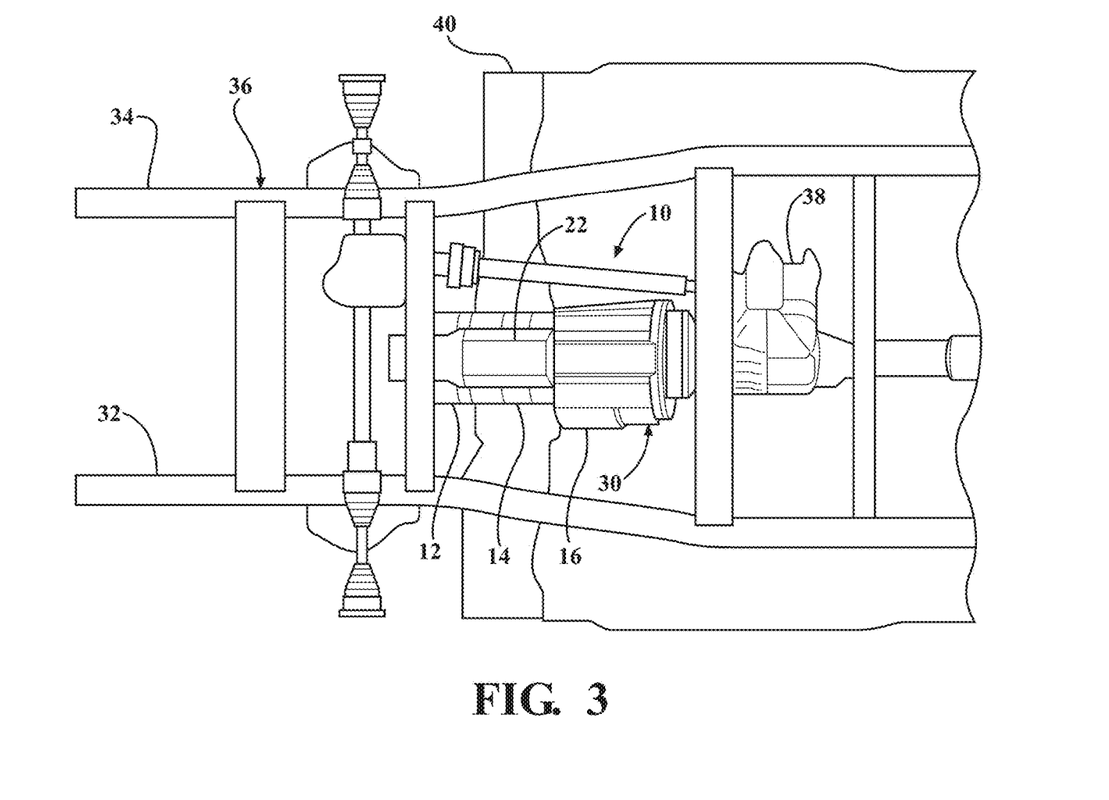
FIG. 3 is a bottom view of a vehicle with the powertrain embodiment shown in FIGS. 1A and 1B mounted thereto.

Referring to FIGS. 2 and 3, the powertrain 30 is shown mounted between two rails 32, 34 of a vehicular frame, generally shown at 36. A body 40, including a passenger compartment (not shown), is shown fixedly secured to the vehicular frame 36. Referring specifically to FIG. 3, the transmission 10 is shown connected to a drive line 38 that drives four wheels (none shown).

Figure 4:
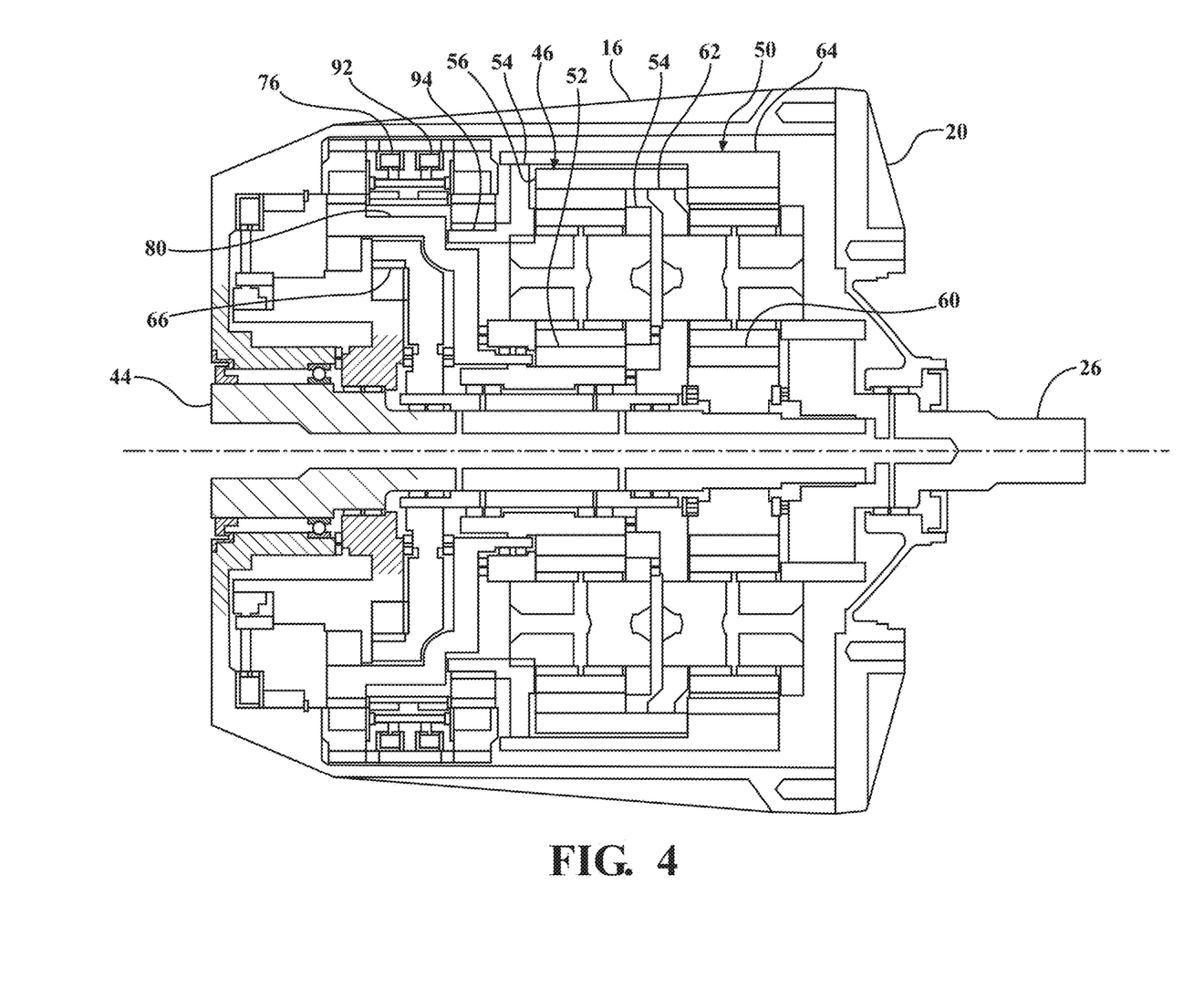
FIG. 4 is a cross-sectional side view of a transmission having one input.
Figure 5:
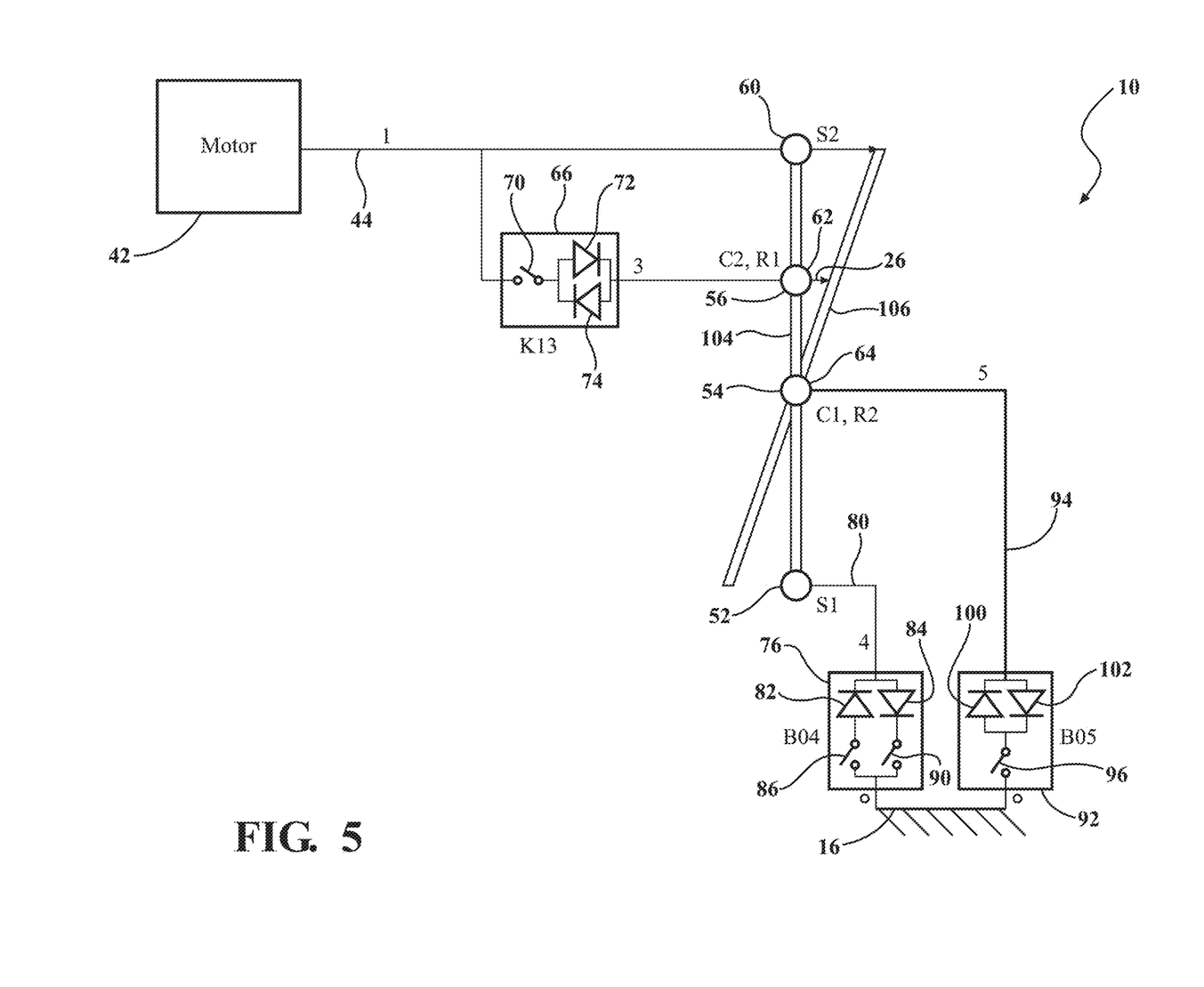
FIG. 5 is a lever diagram of one embodiment of a transmission having one embodiment.

Referring to FIGS. 4 and 5, the transmission 10 is shown in a configuration for operating with a single input. In this configuration, the single input is the first motor 12 fixedly secured directly to the transmission housing 16 in the absence of the second motor 14. The first motor 12 is not shown in FIG. 4, but the first motor output shaft 18 would be received the input shaft 44.

The input shaft 44 is also designated as shaft "1" in the power flow shown in FIG. 5. The transmission 10 also includes a first gearset, generally shown at 46, and a second gearset, generally shown at 50. The first gearset 46 includes first 52, second 54 and third 56 rotating members. The second gearset 50 includes a fourth 60, fifth 62, and sixth 64 rotating members. These gearsets 46, 50 may be any gearset that has three rotating members. Types of gearsets contemplated include, but are not limited to, Ravigneaux gearsets, Simpson gearsets and ring-carrier/ring-carrier gearsets. The gearsets 46, 50 shown in FIGS. 4 and 5 are ring-carrier/ring-carrier gearsets. Because these gearsets 46, 50 are ring-carrier/ring-carrier gearsets, the first 52, second 54 and third 56 rotating members are a sun gear, a carrier, and a ring gear, respectively. These are indicated as S1, C1, and R1 for the first gearset 46 and S2, C2, and R2 for the second gearset 50. Two rotating members from the first gearset 46 and two rotating members from the second gearset 50 are fixedly secured to each other. These connections create a four-node linkage for the transmission 10. As such, each pair of rotating members is represented by a single circle in FIG. 5. Therefore, the first rotating member 56 (ring gear R1) and the fifth rotating member 62 (carrier C2) are fixedly secured to each other and represented by both reference numerals 56 and 62 in FIG. 5, whereas the second rotating member 54 (carrier C1) and the sixth rotating member 64 (ring gear R2) are fixedly secured to each other and represented by both reference numerals 54 and 64 in FIG. 5.

The output shaft 26 of the transmission 10 is also fixedly secured to two rotating members, one from each gearset 46, 50. In the embodiment shown in FIGS. 4 and 5, the output shaft 26 is fixedly secured to the third rotating member 56 (the ring gear R1 of the first gearset 46 and the fifth rotating member 62 of the second gearset 50 (the carrier C2 of the second gearset 50). The motor 12 is connected directly to the fourth rotating member 60 of the second gearset 50 using the input shaft 44 (shaft 1).

A controllable clutch 66 is connected between the input shaft 44 (shaft 1) at one end and the output shaft 26 (shaft 3) at the other end. The controllable clutch 66 is also represented by the nomenclature K13 because it couples shafts 1 and 3 together. Referring specifically to FIG. 5, the controllable clutch 66 is represented by a switch 70 and two diodes 72, 74. These three elements 70, 72, 74 represent the attributes of the controllable clutch 66. More specifically, the switch 70 signifies that the controllable clutch 66 may be turned on and off. The diodes 72, 74 represent the fact that the controllable clutch 66 will the third rotating member 56 (ring gear R1), the fifth rotating member 62 (second carrier C2) and the output shaft 26 (shaft 3) to lock in both directions, or to rotate freely in both directions. Therefore, when the switch 70 is closed, representing the active state for the controllable clutch 66, the output shaft 26 rotates with the rotation of the input shaft 44. When the switch 70 is open, representing an inactive state for the controllable clutch 66, the output shaft 26 does not rotate or, alternatively, rotates based on the torques it receives from the other rotating elements 52, 54, 60, 64 of the first 46 and second 50 gearsets.

The transmission 10 also includes a first controllable brake 76 (B04) that couples the first rotating member 52 (sun gear S1) of the first gearset 46 to the transmission housing 16. The first controllable brake 76 also has the symbol B04 because it is a brake that connects shaft 0 (which is just the transmission housing 16) with a fourth shaft 80 (shaft 4). The first controllable brake 76 (B04) is similar to the controllable clutch 66 in that it is represented by two diodes 82, 84 representing that it will lock and allow rotation in either direction. The first controllable brake 76 (B04) is different from the controllable clutch 66 in that each direction of operation can be controlled independently of the other, as represented by switches 86, 90. Operation of the first controllable brake 76 will be discussed in greater detail subsequently.

This transmission 10 also includes a second controllable brake 92 (B05) which couples the second rotating member 54 (carrier C1) of the first gearset 46 and the sixth rotating member 64 (ring R2) of the second gearset 50 to the transmission housing 16. The second controllable brake 92 differs from the first controllable brake 76 in that it only has the ability to control whether a notch plate 94 (shaft 5) is rotating or if it is tied to the transmission housing 16 and prevented from rotating. As such, the second controllable brake 92 only includes a single switch 96 representing the two states of the second controllable clutch 92 (B05) as being either on or off, and two diodes 100, 102 indicate that the second controllable brake 92 (B05) can lock or allow the notch plate 94 (shaft 5) rotate in either direction.

Figure 6:
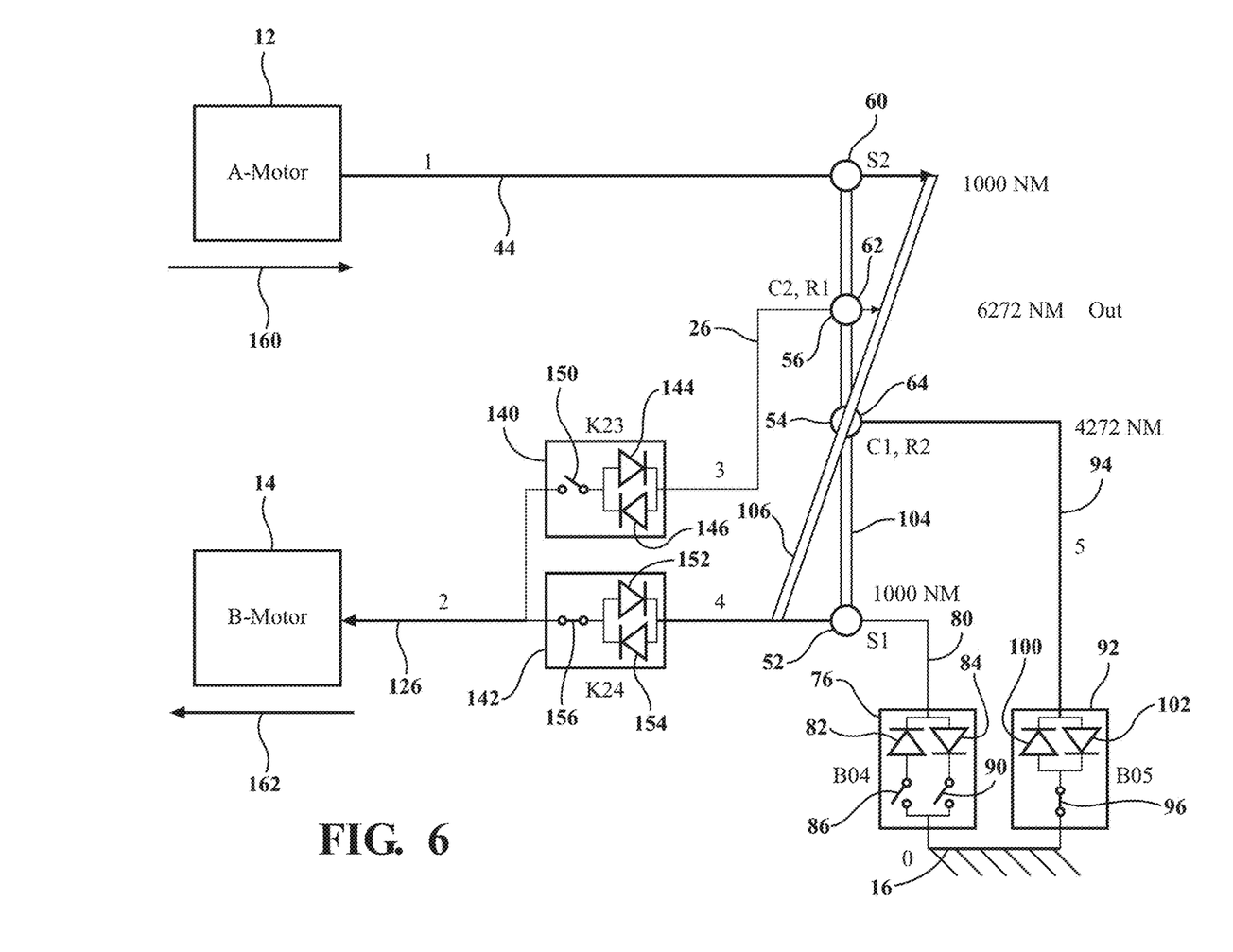
FIG. 6 is a lever diagram of one embodiment of a transmission having two inputs.

Referring to FIG. 6, a lever diagram showing the transmission 10 having two inputs (FIGS. 1A and 1B) is shown. The lever diagram is substantially similar to lever diagram for the single-input transmission shown in FIG. 5. One difference between the two configurations is the transmission 10 has two input shafts 44, 126, wherein the first input shaft 44 receives torque from the first motor 12 (A-Motor) and the second input shaft 126 receives torque from the second motor 14 (B-Motor). Another difference between the two configurations is the use of two controllable clutches 140 (K23), 142 (K24) instead of the single controllable clutch 66 (K13).

The output of the first motor 12 (A-Motor) is received by the first input shaft 44 (shaft 1), which is fixedly secured to the fourth rotating member 60 (sun gear S2) of the second gearset 50. The output of the second motor 14 (B-Motor) is received by the second input shaft 126 (shaft 2). The second input shaft 126 (shaft 2) is connected to the first controllable clutch 140 (K23) and the second controllable clutch 142 (K24). The first controllable clutch 140 (K23) operates in both directions as is indicated by the diodes 144, 146, which are oriented in opposite directions. A switch 150 illustrates that the clutch 140 (K23) is controllable and may be locked or allowed to rotate in both directions. The second controllable clutch 142 (K24) operates in both directions, as is indicated by the diodes 152, 154, which are oriented in opposite directions. A switch 156 illustrates that the controllable clutch 142 (K24) is controllable and may be locked or allowed to rotate in both directions.

The first controllable clutch 140 (K23) couples the second input shaft 126 (shaft 2) and the output shaft 26 (shaft 3). The second controllable clutch 142 (K24) couples the second input shaft 126 (shaft 2) with the fourth shaft 80 (shaft 4). As discussed above, the output shaft 26 is fixedly secured to both the third rotating member 56 (ring R1) of the first gearset 46 and the fifth rotating member 62 (carrier C2) of the second gearset 50.

The transmission 10 also includes a first controllable brake 76 (B04) that couples the first rotating member 52 (sun gear S1) of the first gearset 46 to the transmission housing 16. The first controllable brake 76 also has the symbol B04 because it is a brake that connects the transmission housing 16 (shaft 0) with a fourth shaft 80 (shaft 4). The first controllable brake 76 is similar to the controllable clutches 140, 142 in that it is represented by two diodes 82, 84 representing operation in either direction. The first controllable brake 76 is different from the controllable clutches 140, 142 in that each direction of operation can be controlled independently of the other, as represented by the two switches 86, 90. Operation of the first controllable brake 76 will be discussed in greater detail subsequently.

This transmission 10 also includes a second controllable brake 92 (B05) which couples the second rotating member 54 (carrier C1) of the first gearset 46 and the sixth rotating member 64 (ring R2) of the second gearset 50 to the transmission housing 16. The second controllable brake 92 differs from the first controllable brake 76 in that it only can control whether a notch plate 94 (shaft 5) is rotating, or if it is tied to the transmission housing 16 and prevented from rotating. As such, the second controllable brake 92 only includes a single switch 96 representing the two states of the second controllable clutch 92 (B05) as being either on or off, and two diodes 100, 102 indicate that the second controllable brake 92 (B05) can lock in both directions or it can move freely in both directions.

Because the first 46 and second 50 gearsets are ring-carrier/ring-carrier gearsets, the connections described in the power flow in FIG. 5, and the first 18 and second 19 motor output shafts are coaxial, the second motor 14 (B-Motor) is able to drive the output shaft 26 (shaft 3) directly. The number of modes of operation increase due to this capability. In the embodiments shown in the Figures, the first motor output shaft 18 extends through the second motor output shaft 19. As such, the second motor output shaft 19 is hollow providing a space through which the first motor output shaft 18 extends.

In FIG. 5, the steady-state lever 104 represent when the host vehicle is not in motion. The operational lever 106 represents when the vehicle is moving through the operation of the first motor 12 (A Motor) and/or the second motor 14 (B Motor). The first controllable clutch 140 (K23) is open as represented by the switch 150 being open. In addition, the second controllable clutch 142 (K24) is closed. Therefore, the second motor 14 (B Motor) is coupled to the first rotating member 52 (sun gear S1) of the first gearset 46. The first rotating member 52 (sun gear S1) is not grounded to the transmission housing 16 because the first controllable brake 76 (B04) is open. Finally, the second controllable brake 92 (B05) is closed tying the second rotating member 54 (carrier C1) of the first gearset 46 and the sixth rotating member 64 (ring gear R2) of the second gearset 50 are ground to the transmission housing 16 through the notch plat 94 (shaft 5).

In this configuration, the first motor 12 is operating in the forward direction, indicated by arrow 160, and the second motor 14 is operating in the reverse direction, indicated by arrow 162. By way of example, and in not to be limiting, exemplary torques are provided based on the designs of the gearsets 46, 50 and the motors 12, 14. Given the output of the first motor 12 (A Motor) provides a torque of 1000 NM on the second sun gear 60 (sun gear S2) and the output of the second motor 14 provides a torque of 1000 NM in the opposite direction on the first rotating member 52 (sun gear S1) results in a torque of 4272 NM on the second rotating member 54 (carrier C1) of the first gearset 46 and the sixth rotating member 64 (ring gear R2) of the second gearset 50 and an output torque of 6272 NM at the output shaft 26. This is "first gear." The transmission 10 is more fully described in U.S. Pat. No. 10,711,867, which is co-owned by Applicant, and the disclosure therein is expressly incorporated herein by reference.

Referring to FIGS. 7 through 10, clutch elements are shown in various stages of operation to facilitate the shifting of the transmission 10. The clutch elements may be used for either brake clutches or controllable clutches. In the embodiment shown, the clutch elements are a part of the the first controllable brake 76 (B04). It should be appreciated by those skilled in the art that these clutch elements could be used with any of the independently controllable clutches used in this transmission 10.

Figure 7:
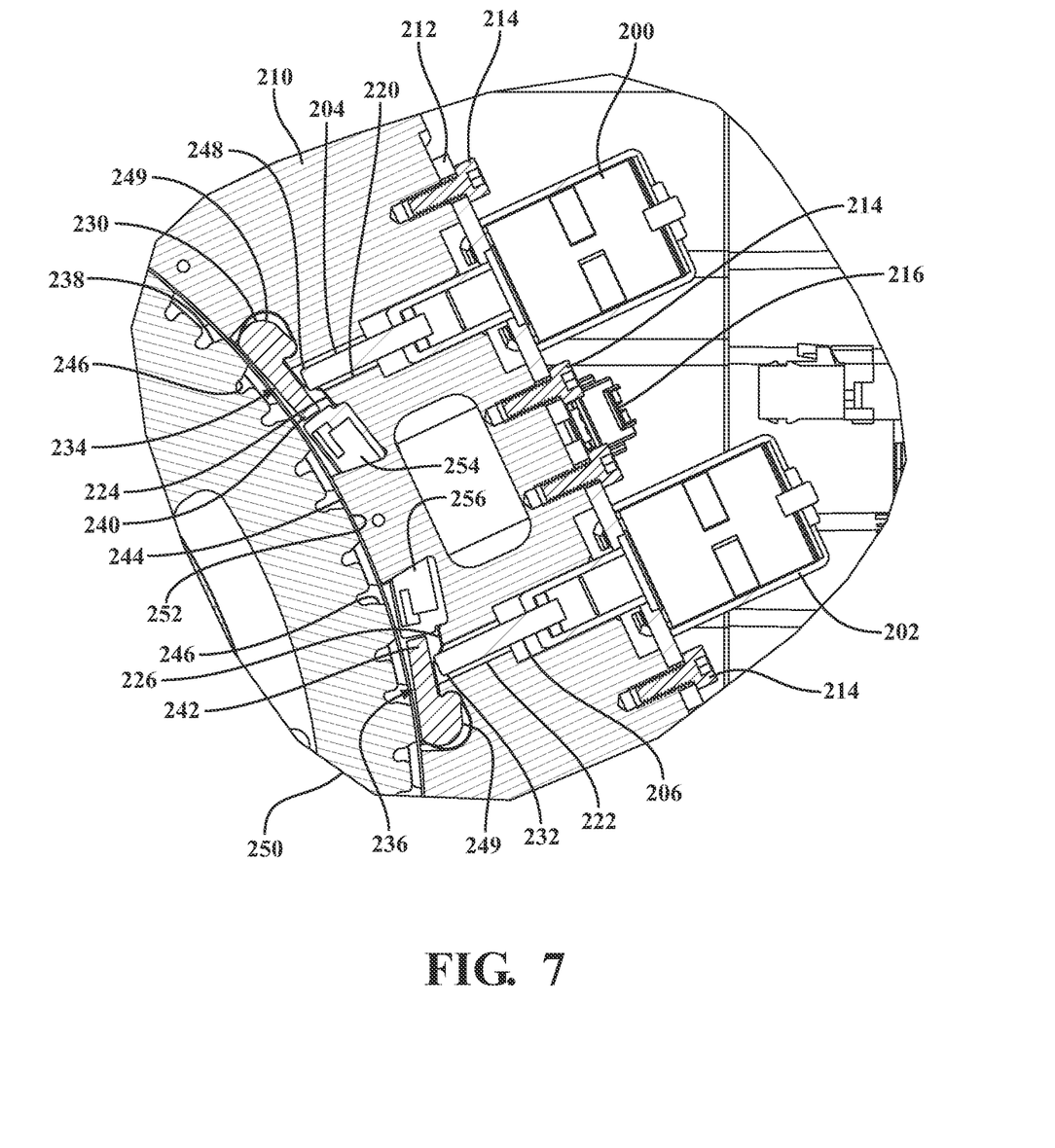
FIG. 7 is a cross-sectional side view, partially cut away, of first and second directional struts used to control elements of a clutch in their respective retracted positions.

Referring specifically to FIG. 7, the clutch elements shown include first 200 and second 202 actuators. In the embodiment shown, the first 200 and second 202 actuators are solenoids, each having a plunger 204, 206, respectively. The actuators 200, 202 are fixedly secured to a pocket plate 210 using a mounting plate 212 and a plurality of bolts 214. Electrical power to and control of the two actuators 200, 202 come through a communications module as represented by a wire harness connector 216 as is known in the art. The plungers 204, 206 extend through channels 220, 222, respectively, in the pocket plate 210 and into first 224 and second 226 pockets disposed adjacent to an inner diameter (244) of the pocket plate 210. The channels 220, 222 allow the plungers 204, 206 to move axially between respective retracted positions (FIG. 7) and extended positions (FIG. 10) wherein distal ends 230, 232 of the plungers 204, 206 extend into the pockets 224, 226 of the pocket plate 210. The plungers 204, 206 and channels 220, 222 are linear and the plungers 204, 206 move back and forth along the channels 220, 222, but they 204, 206, 220, 222 may or may not be radial extensions of the notch plate 250.

In each of the first 224 and second 226 pockets are first 234 and second 236 directional struts. The struts 234, 236 reside in the pockets 224, 226. In their retracted positions, the struts 234, 236 are completely within their respective pockets 224, 226. When the struts 234, 236 pivot, an engagement portion 240, 242 of the struts 234, 236 move out beyond the pockets 224, 226 past a pocket plate inner diameter 244 and into notches 246 of a notch plate 250 having an outer diameter 252 slightly smaller than the pocket plate inner diameter 244. More specifically, the engagement portions 240, 242 of the struts 234, 236 engage respective notch walls 238, 239 of the notches 246. Position modules 254, 256 identify the position of the struts 234, 236. Examples of position sensors are described in U.S. patent application owned by Applicant, having Ser. No. 17/495,062, the specification of which is hereby incorporated by reference. It should be appreciated by those skilled in the art that a clutch may include a plurality of these actuator/strut pairs and only a pair of these actuator/strut assemblies are shown in the Figures for purposes of simplicity.

FIG. 7 is a default starting position of the clutch elements using the method described herein. In FIG. 7, all of the struts 234, 236 are retracted into their respective pockets 224, 226. This allows the notch plate 250 to rotate freely with respect to the pocket plate 210. In this embodiment, the pocket plate 210 does not rotate and is fixed to ground (typically, the transmission housing 16). However, it should be appreciated by those skilled in the art that other embodiments can include a pocket plate that rotates independently of the notch plate 250 and with respect to the transmission housing 16 (ground).

Figure 11:
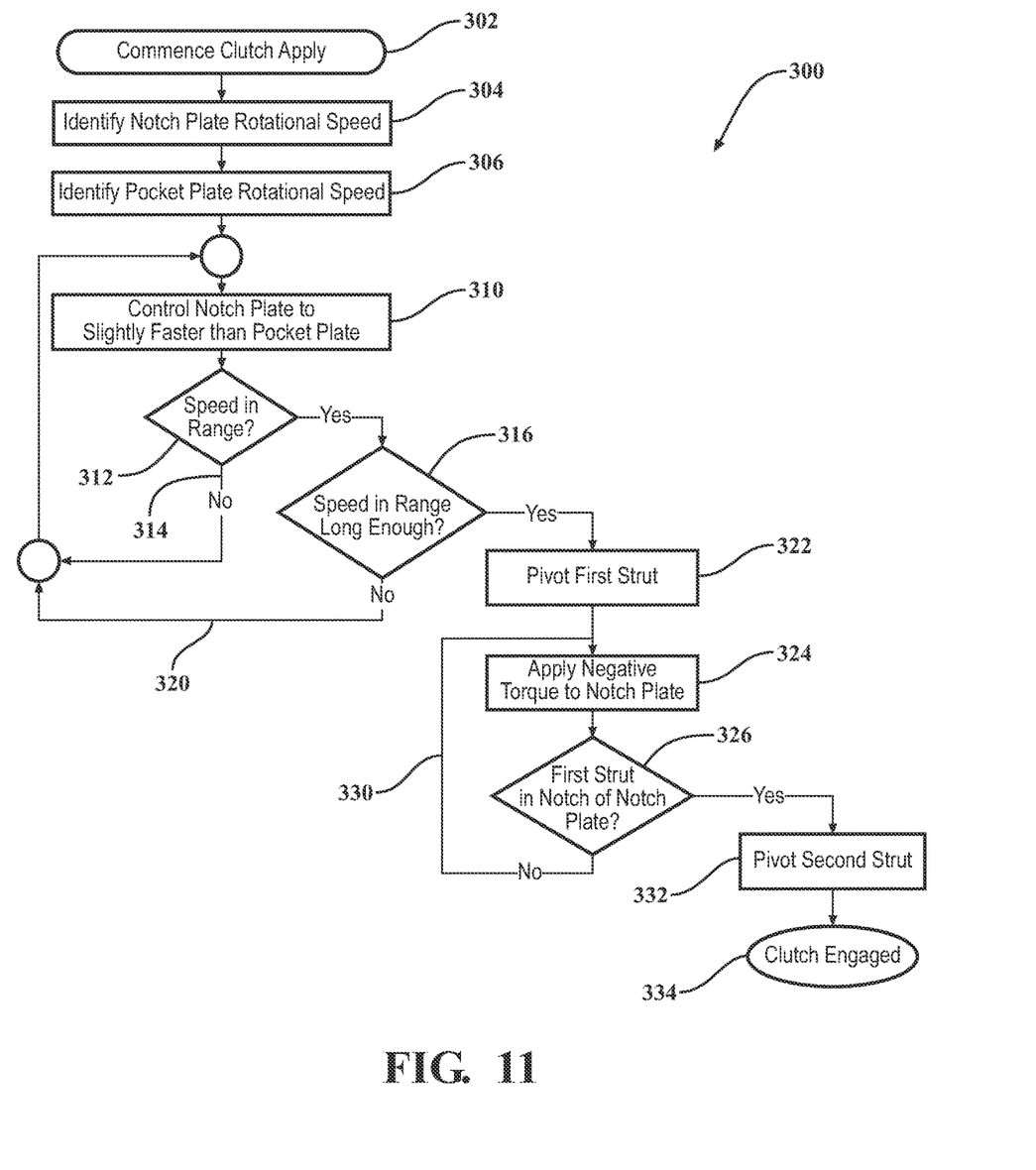
FIG. 11 is a flow chart of a method to engage a first directional strut to a rotational element of a clutch assembly.

Turning attention to FIG. 11, the method used to operate the clutch elements is generally shown at 300. The method 300 begins with commencing a clutch apply at 302. As stated above, this occurs when the clutch elements are in the orientation shown in FIG. 7, namely the first 234 and second 236 struts are fully retracted in their respective first 224 and second 226 pockets within the pocket plate 210. The rotational speed of the notch plate 250 is identified at 304 as the notch rotational speed, and the rotational speed of the pocket plate 210 is also identified at 306 as the pocket rotational speed. Identification may occur through either measurement using speed sensors or through calculations based on the rotational speeds of other elements in the clutch and/or transmission 10.

Once the respective rotational speeds of the notch 250 and pocket 210 plates have been identified, the method 300 controls the notch rotational speed to match it to the pocket rotational speed (even if the rotational speed of the pocket plate 210 is zero). Control of the relative rotational speed can be done using proportional integral derivative (PID) control. This step occurs at 310 in FIG. 11. The matching of the rotational speeds of the notch plate 250 with that of the pocket plate 210 allows the first 234 and second 236 struts to pivot within their respective pockets 224, 226 reduces the noise created by the clutch. "Match" as used herein implies that the rotational speeds are relatively close; they do not need to be identical. The notch plate 250 can be rotating slightly faster or slower than the pocket plate 210 for the two plates 210, 250 to be considered matching. Matching rotational speeds allows for a positive and a negative difference in the rotational speeds between the notch 250 and pocket 210 plates.

It is determined at 312 whether the rotational speed of the notch plate 250 matches the rotational speed of the pocket plate 210 within a predetermined range. By way of example only, an acceptable range within which the method 300 would accept would be a relative difference less than 20 RPM. Obviously, the difference will be based on the actual configuration of the elements of the clutch and the transmission 10. If it is determined that the relative rotational speed of the notch plate 250 is not within the predetermined range of the rotational speed of the pocket plate 210, the method 300 loops back at 314 and continues to control the rotational speed of the notch plate 250 at 310. A counter resets whenever the speed is not within the predetermined range requiring a loop back at 314.

If it is confirmed that the rotational speed of the notch plate 250 is within the acceptable range based on the rotational speed of the pocket plate 210, the method 300 then determines if the relative rotational speed of the notch plate 250 is within the acceptable range for a predetermined period of time at 316. The counter will continue until the relative rotational speed falls out of the range or the predetermined period of time is met. If the rotational speed of the notch plate 250 is not within the acceptable range for the predetermined period of time, the method 300 loops back at 320 to continue controlling the rotational speed of the notch plate 250 at 310.

Figure 8:
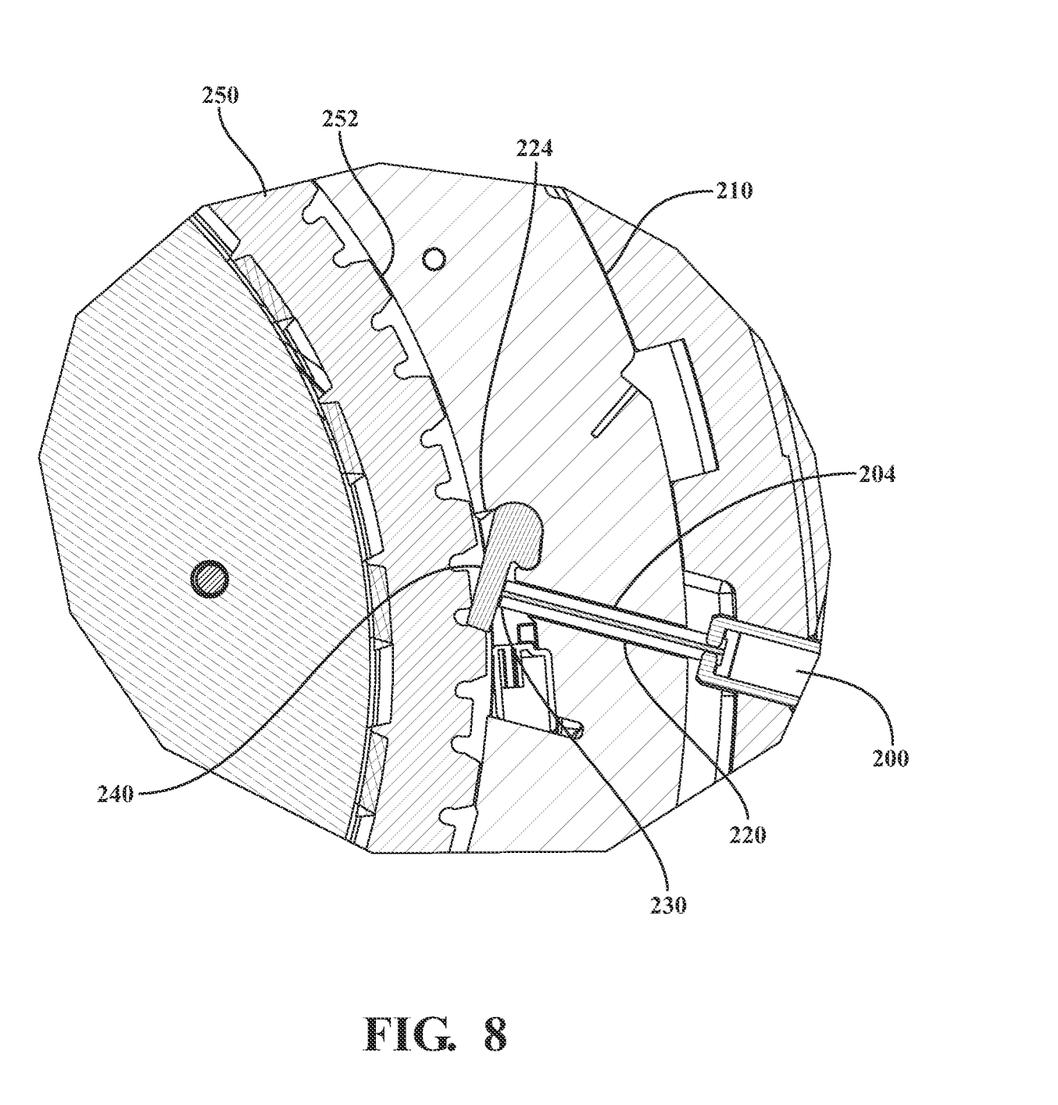
FIG. 8 is a cross-sectional side view, partially cut away, of the first directional strut extended into a notch plate of a clutch.

Once the rotational speed of the notch plate 250 is within the acceptable range for the predetermined time, the method 300 activates the first clutch actuator 200 at 322 to pivot the first strut 234 such that the engagement portion of the first strut 234 extends beyond the pocket plate inner diameter 244 and is received by a notch 246 in the notch plate 250. The orientation of the first strut 234 and the extension of the plunger 204 of the first clutch actuator 200 are shown in FIG. 8.

After the engagement portion 240 of the first strut 234 exits one of the pockets 224, the method 300 applies a negative or reverse torque to the notch plate 250 at 324. This reverses the direction of rotation of the notch plate 250. The negative torque apply is to ensure the engagement portion of the first strut 234 actually enters the notch 246 and engages the notch 246. This forces the notch plate 250 into a reverse direction. The first strut 234 prevents the rotation of the notch plate in the reverse direction an amount equal 360 degrees divided by the number of notches 246 in the notch plate 250. In one embodiment, this limitation is less than three degrees.

Figure 9:
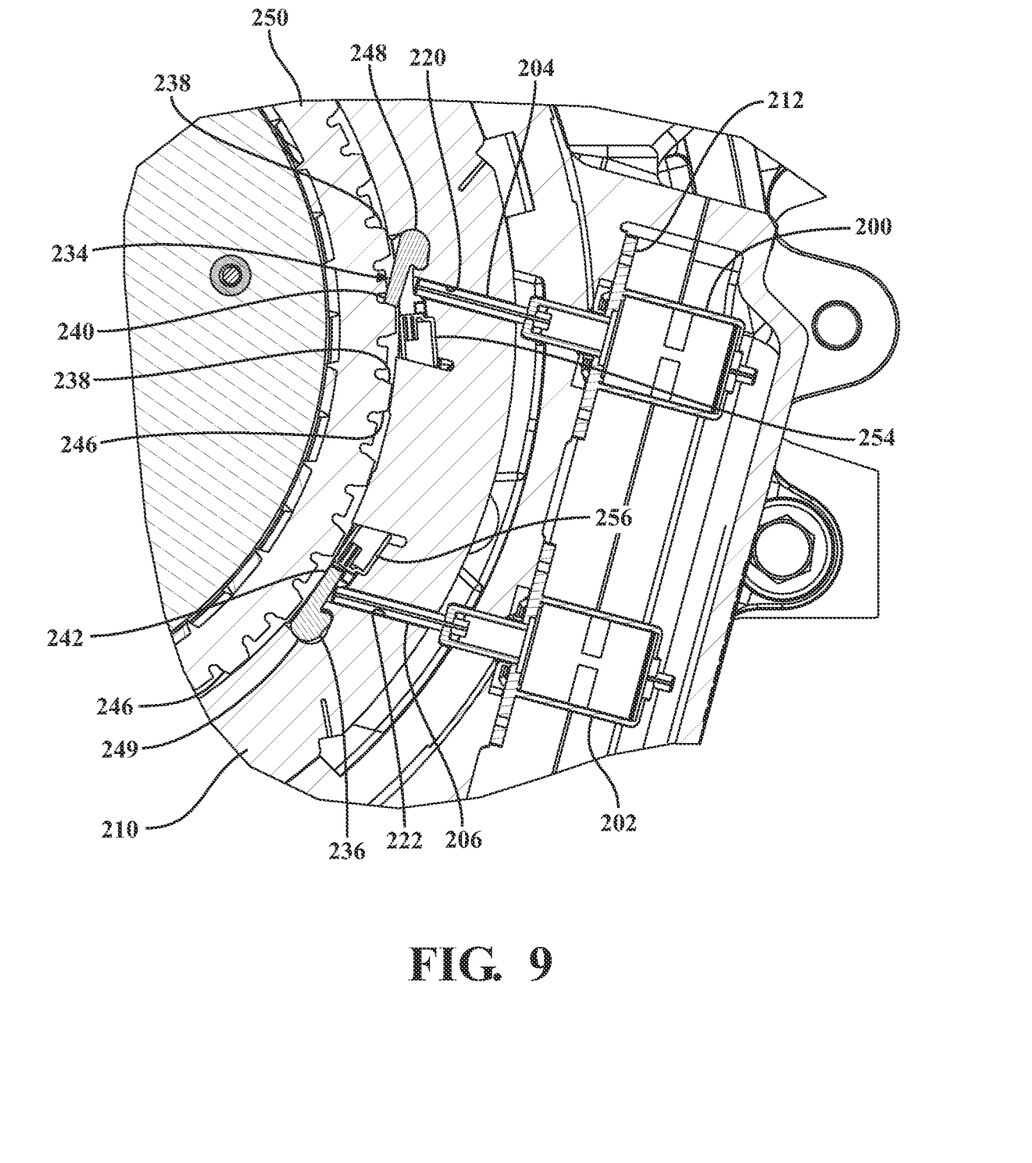
FIG. 9 is a cross-sectional side view, partially cut away, of first and second direction struts used to control elements of a clutch, with the first direction strut remaining in the extended position when a first direction actuator is off.

If the negative torque is large enough, it will force the first strut 234 to pivot further within the notch 246 and its pocket 224. This additional rotation, which creates three points of contact between the first strut 234, the notch 246 and the first pocket 224 is referred to as camming. The negative torque sufficient to create the camming will create an abutting relationship between a wall 238 of the notch 246 and the engagement portion 240 of the first strut 234. The extended push rod ensures the first strut 234 will be retained within the notch 246 (possibly ratcheting in one direction). This is represented by FIG. 9 wherein the first strut 234 has been retained in the notch 246 (by virtue of contact with engagement surface with the notch wall 238) even though the plunger 204 of the first clutch actuator 200 has been retracted and no longer is pushing the first strut 234 in any direction. In this condition, the clutch is engaged.

Figure 10:
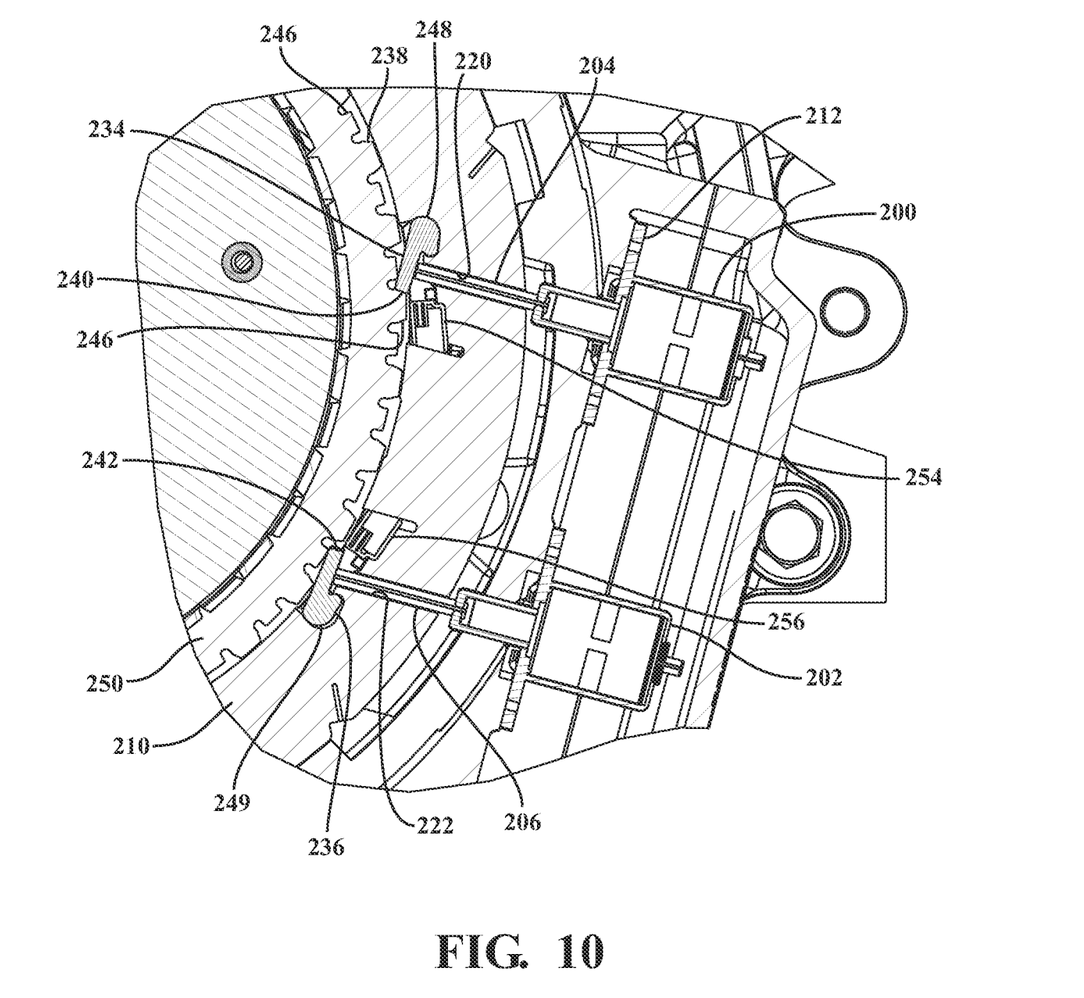
FIG. 10 is a cross-sectional side view, partially cut away, of the first and second directional struts used to control elements of a clutch in their respective extended positions.

After the negative torque is applied, confirmation for the orientation of the first strut 234 is requested at 326. If the first strut 234 orientation is not confirmed, the method 300 loops back at 330 to continue applying a negative torque to the notch plate 250. If the first strut 234 orientation is confirmed, the second strut 236 is pivoted at 332 into a notch 246 of the notch plate 250 and the clutch is engaged at 334. This condition is represented in FIG. 10, wherein the notch plate 250 is locked with the pocket plate 210.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

We claim:

1. A method for selectively locking a notch plate to a pocket plate such that the notch and pocket plates rotate together, wherein the pocket plate includes at least one first direction strut and at least one second direction strut, the method comprising the steps of:

identifying a pocket rotational speed of the pocket plate;

identifying a notch rotational speed of the notch plate;

modifying the notch rotational speed of the notch plate such that the notch rotational speed approaches the pocket rotational speed;

pivoting the at least one first direction strut such that it extends past the pocket plate allowing the first direction strut to engage the notch plate;

matching the notch rotational speed to equal the pocket rotational speed to allow the at least one first direction strut to extend into the notch of the notch plate;

decreasing the notch rotational speed to less than the pocket rotational speed such that the notch plate engages the at least one first direction strut; and pivoting the at least one second direction strut to engage the notch plate preventing relative motion between the notch and pocket plates in either direction.

2. A method as set forth in claim 1 wherein the step of pivoting the at least one first direction strut includes ratcheting the at least one first direction strut against the notch plate.

3. A method as set forth in claim 1 including the step of camming the at least one first direction strut further into the notch plate.

4. A method as set forth in claim 3 including the step of rotating the notch plate in a reverse direction to release the at least one first direction strut.

5. A method as set forth in claim 4 wherein the step of rotating the notch plate in the reverse direction includes the step of limiting the rotation of the notch plate equal or less than 360 degrees divided by the number of notches in the notch plate.

6. A method as set forth in claim 5 wherein the step of rotating the notch plate in the reverse direction includes the step of limiting the rotation of the notch plate to an angle sufficient to allow the first strut to release from the notch plate.

7. A method as set forth in claim 6 wherein the angle is less than three degrees.

* * * * *